(12) United States Patent
Yamada

(10) Patent No.: US 7,202,445 B2
(45) Date of Patent: Apr. 10, 2007

(54) DOOR MIRROR HEATER

(75) Inventor: Naoki Yamada, Fujisawa (JP)

(73) Assignee: NOK Corporation, Tokyo (JP)

( * ) Notice: Subject to any disclaimer, the term of this patent is extended or adjusted under 35 U.S.C. 154(b) by 6 days.

(21) Appl. No.: 10/536,449

(22) PCT Filed: Nov. 26, 2003

(86) PCT No.: PCT/JP03/15081

§ 371 (c)(1),
(2), (4) Date: May 26, 2005

(87) PCT Pub. No.: WO2004/048165

PCT Pub. Date: Jun. 10, 2004

(65) Prior Publication Data

US 2006/0011615 A1   Jan. 19, 2006

(30) Foreign Application Priority Data

Nov. 28, 2002   (JP) .............................. 2002-344872

(51) Int. Cl.
H05B 1/00 (2006.01)

(52) U.S. Cl. .................. 219/219; 219/203; 219/553

(58) Field of Classification Search ................ 219/219, 219/553, 203
See application file for complete search history.

(56) References Cited

U.S. PATENT DOCUMENTS

| 4,330,704 | A | * | 5/1982 | Jensen | 219/553 |
| 4,631,391 | A | * | 12/1986 | Tiepke | 219/541 |
| 4,853,520 | A | * | 8/1989 | Hochart et al. | 219/535 |
| 4,857,711 | A | * | 8/1989 | Watts | 219/548 |
| 4,931,627 | A | * | 6/1990 | Watts | 219/548 |
| 5,763,532 | A | * | 6/1998 | Harrington et al. | 525/194 |
| 6,369,513 | B1 | | 4/2002 | Kanazawa | |
| 6,607,679 | B2 | * | 8/2003 | Handa et al. | 252/513 |
| 2006/0086710 | A1 | * | 4/2006 | Meiler et al. | 219/202 |

FOREIGN PATENT DOCUMENTS

| JP | 06-045105 | 1/1994 |
| JP | 07-335378 | 12/1995 |
| JP | 08-017557 | 1/1996 |
| JP | 08-017563 | 1/1996 |
| JP | 08-069864 | 3/1996 |
| JP | 08-120182 | 5/1996 |
| JP | 10-183039 | 7/1998 |
| JP | 2001-069667 | 3/2001 |
| JP | 2001-284859 | 10/2001 |
| JP | 2002-050456 | 2/2002 |
| JP | 2002-146251 | 5/2002 |
| JP | 2002-264780 | 9/2002 |
| JP | 2002-270343 | 9/2002 |
| JP | 2003-160029 | 6/2003 |

* cited by examiner

Primary Examiner—Robin Evans
Assistant Examiner—Vinod Patel
(74) Attorney, Agent, or Firm—Jacobson Holman PLLC

(57) ABSTRACT

To provide a door mirror heater for a vehicle such as a motor vehicle or the like on which a high voltage battery is mounted, a door mirror heater compliant to a high voltage battery having a heat generating circuit provided with a PTC layer corresponding to a heating element and electrodes for applying a current to the PTC layer is structured such that an initial resistance value of the heat generating circuit is set between 20 and 200 Ω, more preferably between 50 and 100 Ω, a lower limit value of a PTC characteristic $R_{100°\ C.}/R_{25°\ C.}$ is set to 10, more preferably, to 50, and a rubber is added to a main material polymer of the PTC layer, and a metal oxide is added as a filler.

1 Claim, 2 Drawing Sheets

DOOR MIRROR HEATER

This is a nationalization of PCT/JP03/015081 filed Nov. 26, 2003 and published in Japanese.

TECHNICAL FIELD

The present invention relates to a door mirror heater used for heating a door mirror in a vehicle such as a motor vehicle or the like from a back surface side thereof so as to remove a rain drop, a dew, a frost or the like attached to a front surface thereof or prevent the front surface of the mirror from clouding up.

BACKGROUND ART

Electrical and electronic parts mounted on a vehicle have been conventionally designed in compliance to a battery voltage of 12 V. However, a voltage of a battery for the vehicle is increased to a high voltage of 42 V in recent days. Accordingly, an electric current flowing therethrough is widely increased and a generated electric power is increased in the case of employing the conventional design, so that a problem is caused. In the case of a heating element for a door mirror heater or the like, if the heating element of the specification of 12 V is used under 42 V, an initial power becomes 12.25 times (on the basis of the expression $P=I \cdot E$). Further, since a resistance is not infinitely great even in a PTC heating element, there is a risk that the temperature exceeds a set temperature range.

In the door mirror heater for the battery voltage of 12 V, an initial resistance value is set to be less than 2 to 20 $\Omega$ on the basis of the required heat generation temperature. However, in the case that the door mirror heater is attached to the vehicle mounting the high voltage battery having the voltage of 42 V as it is, the initial current value is increased, and exceeds a current distribution with respect to the other electrical equipments on the basis of the battery capacity, and the heat generating amount becomes enormous. Accordingly, even if the PTC function is provided, the heat generation temperature exceeds the set range (refer to Japanese Unexamined Patent Publication No. 2001-284859, Japanese Unexamined Patent Publication No. 2002-50456, Japanese Unexamined Patent Publication No. 2002-146251 and the like).

The present invention is made by taking the points mentioned above into consideration, and an object of the present invention is to provide a door mirror heater which can corresponds to a high voltage battery.

DISCLOSURE OF THE INVENTION

In order to achieve the object mentioned above, in accordance with the present invention, there is provided a door mirror heater compliant to a high voltage battery having a heat generating circuit provided with a PTC layer corresponding to a heating element and electrodes for applying a current to the PTC layer, wherein an initial resistance value of the heat generating circuit is set between 20 and 200 $\Omega$, more preferably between 50 and 100 $\Omega$, and a lower limit value of a PTC characteristic $R_{100°C}/R_{25°C}$ is set to 10, more preferably, to 50. This structure is separated into a first aspect and a second aspect. Therefore, in accordance with a first aspect of the present invention, there is provided a door mirror heater wherein the numerical value range is set wider, and the initial resistance value of the heat generating circuit is set between 20 and 200 $\Omega$, and the lower limit value of a PTC characteristic $R_{100°C}/R_{25°C}$ is set to 10. Further, in accordance with a second aspect of the present invention, there is provided a door mirror heater wherein the numerical value range is set narrower, and the initial resistance value of the heat generating circuit is set between 50 and 100 $\Omega$, and the lower limit value of a PTC characteristic $R_{100°C}/R_{25°C}$ is set to 50.

Further, in accordance with a third aspect of the present invention, there is provided a door mirror heater as recited in the first aspect or the second aspect mentioned above, wherein a rubber is added to a main material polymer of the PTC layer, and a metal oxide is added as a filler.

In order to comply to the battery voltage of 42 V, it is first preferable that the initial resistance value of the heat generating circuit is set between 20 and 200 $\Omega$, and between 50 and 100 $\Omega$ in order to obtain an improved performance. This is because of the following reasons. The resistance relates directly to the power when applying the current thereto, and directly affects a clearing performance of the door mirror. If the resistance value exceeds 100 $\Omega$ and becomes further larger than 200 $\Omega$, the power becomes smaller, the heat generation amount becomes smaller, and an attainable temperature of the door mirror becomes lower so as to deteriorate the clearing performance. On the other hand, when the resistance value is lower than 50 $\Omega$, and becomes further smaller than 20 $\Omega$, the initial current value becomes larger, and there is a risk that the initial current value exceeds the current distribution with respect to the other electrical equipment on the basis of the battery capacity. Further, even if the PTC characteristic is provided, the heat generating amount becomes larger, and a surface temperature of the door mirror becomes higher, so that a problem on safety is generated. In other words, since there is a risk that an exposed portion of a skin such as a hand or the like is burned in the case that the exposed portion of the skin is erroneously in contact with the heated door mirror, it is necessary to prevent this contact for the safety reason of the motor vehicle. Accordingly, the initial resistance value of the heat generating circuit is preferably set between 20 and 200 $\Omega$m, and further preferably set between 50 and 100 $\Omega$.

Further, in order to be compliant to the battery voltage of 42 V, it is preferable that the lower limit value of a PTC characteristic $R_{100°C}/R_{25°C}$ is set to 10, and preferably set to 50 for the purpose of obtaining an improved performance. This is because of the following reasons. The PTC characteristic serves as a function of increasing the resistance value and reducing the power so as to inhibit the heat generation near the necessary temperature for the purpose of generating heat at an optional temperature, a function of restricting the temperature to a temperature preventing the heat burn even in the case of being in contact therewith, and a function of enlarging the resistance increase with respect to the temperature even in the case that the supplied voltage is increased, thereby preventing an excessive heat generation and a consequent burnout from being generated. Accordingly, the PTC characteristic requires a large value to some extent, and if it is at least 10 or more, and preferably 50 or more, it is possible to sufficiently achieve the functions mentioned above. Therefore, because of the matters mentioned above, the lower limit value of a PTC characteristic $R_{100°C}/R_{25°C}$ is preferably 10 or more, and more preferably 50 or more.

Further, in addition thereto, in accordance with the door mirror heater on the basis of the third aspect of the present invention, since the rubber is added to the main material of the PTC layer, and the metal oxide is added as the filler, it is possible to well secure a workability in manufacturing the heater and in the product, a broken characteristic, an adhesive property, a resistance stability and an electricity applying durability.

BEST MODE FOR CARRYING OUT THE INVENTION

Embodiment 1) Invention in Accordance with First Aspect and Second Aspect

A door mirror heater is basically structured such that an electrode is arranged in a PTC layer, a terminal for connecting to a power source therefrom is provided, and an outer side thereof is covered by an insulating layer.

The PTC layer is basically blended such that a conductive particle or a filler for reinforcing is dispersed in a polymer forming a matrix. Further, the polymer is bridged and cured as occasion demands.

As for the polymer, in order to achieve a larger PTC characteristic, a polymer having a large linear expansion coefficient in a use temperature region such as a polyethylene and EVA, EEA, EAA, ionomer or the like corresponding to a copolymer of the polyethylene is employed.

As for the conductive particle, a carbon black, a graphite, a metal powder or the like is employed. In particular, in the case of the carbon black, a carbon black having a large particle diameter and a small structure such as GPF, SRF, FT and the like is suitable for obtaining a great PTC characteristic in comparison with a carbon black in which the particle diameter is small and the structure grows such as an acetylene black, a Ketjen black and the like developed for obtaining a high conductivity.

As for the filler, a metal oxide or the like is employed as occasion demands such as an improvement of strength in the PTC layer, or the like.

A rate of the polymer, the conductive particle and the filler is set such that the polymer is 40 to 98 vol %, preferably, 50 to 96 vol %. If the polymer rate becomes smaller, it is impossible to hold the conductive particle and the filler, and a strength is embrittled. Further, if the polymer rate becomes larger, it is impossible to obtain a resistance necessary for the heating element. The other portions than the polymer are set to a rate for obtaining a necessary resistance, by the conductive particle and the filler.

The electrode is formed by arranging a conductive ink, a dotite or the like on a surface of the PTC layer in accordance with a printing method or the like, or formed by applying a metal foil to the surface of the PTC layer by an adhesive agent or a heat compression and forming a necessary pattern in accordance with an etching method or the like.

The insulating layer is formed by attaching an insulating film such as PET, PI or the like to the PTC layer by using an adhesive agent.

Figure 1:
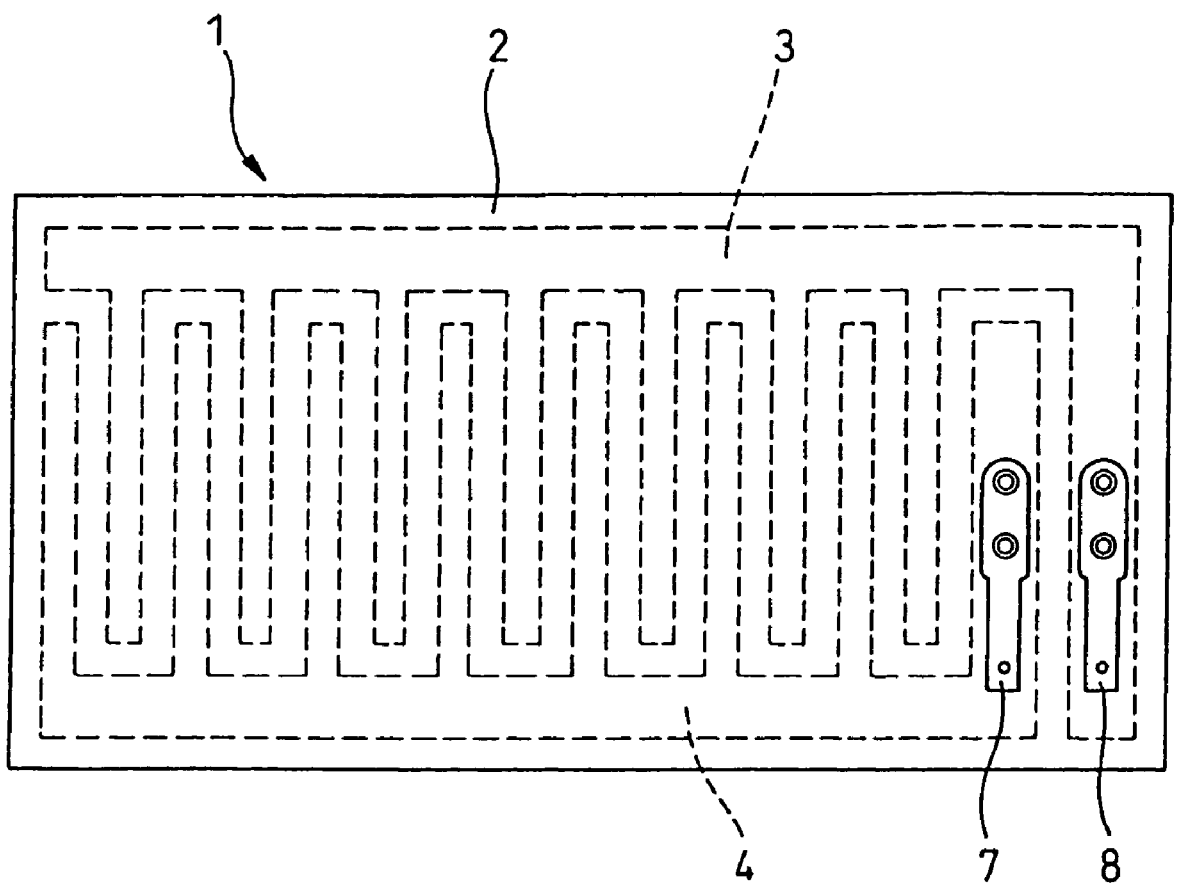
FIG. 1 is a plan view showing an example of a surface heating element used as a door mirror heater in accordance with an embodiment of the present invention.
Figure 2:
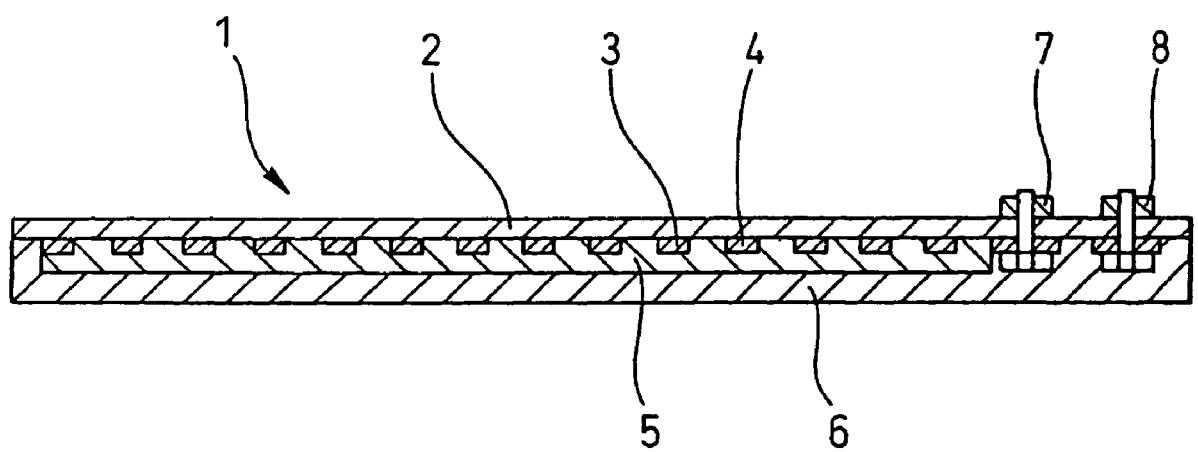
FIG. 2 is a cross sectional view of the surface heating element.

As mentioned above, the door mirror heater for the motor vehicle is basically structured such that the electrode is arranged in the PTC layer, the terminal for connecting to the power source therefrom is provided, and the outer side thereof is covered by the insulating layer, and is illustrated, for example, as shown in FIGS. 1 and 2.

FIG. 1 is a plan view showing an example of a surface heating element 1 used as this kind of door mirror heater, and FIG. 2 shows a cross sectional view thereof. The surface heating element 1 is structured as follows.

An insulating film 2 corresponding to an insulative substrate is provided, and a pair of electrodes 3 and 4 are provided on (in a lower side in FIG. 2) the insulating film 2. Further, a PTC heating element 5 corresponding to the PTC layer is put on the electrodes 3 and 4, and an insulating film 6 corresponding to an insulating layer is put on the heating element 5. Further, terminals 7 and 8 are respectively connected to a pair of electrodes 3 and 4.

The door mirror heater generally includes a small door mirror heater for a light car and a compact car, and a large door mirror heater for a recreational vehicle and a minivan, however, the one used in the present embodiment and a comparative example is a door mirror heater in which a comb teeth shaped electrode having a width of 0.5 mm and a pitch of 0.5 mm is arranged in a base material (PET film) having a size of 150 mm×100 mm, a PTC composition is arranged thereon, and a wiring for connecting to a power source is applied and is thereafter covered by the insulating film.

As for the PTC composition, an ink type composition in which a carbon black is dispersed in an ethylene-acrylic acid copolymer (EAA) is employed. The PTC ink is prepared in accordance with a procedure of (1) dissolving the polymer in a solvent, (2) adding the conductive particle and the filler and mixing them, and (3) dispersing the conductive particle and the filler in a polymer solution by a roll mill or the like.

The employed raw material is as follows:

Polymer: S-call 5000 produced by Exxon Mobile

Carbon: HTC#S(SRF) produced by Shin Nikka Carbon

Ketjen Black EC produced by Lion in Comparative example #2

Filler: TIPAQUE A-100 produced by Ishihara Sangyo Kaisha, Ltd.

Since a shape of the door mirror is the same in the embodiment and the comparative example, the resistance is adjusted by regulating a composition rate of the carbon black. An embodiment 1 provides a door mirror heater having the SRF carbon of 12.5 vol % and the resistance value of 50 Ω, an embodiment 2 provides a door mirror heater having the SRF carbon of 12.2 vol % and the resistance value of 120 Ω, a comparative example 1 provides a door mirror heater having the SRF carbon of 14.0 vol % and the resistance value of 5 Ω, and a comparative example 2 provides a door mirror heater having the Ketjen black of 5 vol % and the resistance value of 40 Ω.

The PTC ink is arranged in the base material in accordance with a metal mask printing. In this case, the PTC may be arranged in accordance with the other methods such as a solid composition-compression molding die or the like, in addition to the ink type-printing.

Measuring the resistance value and the PTC characteristic of the heater, a surface temperature at a time of applying the voltage of 42 V so as to heat, and an initial current value at a time of applying the voltage, the results shown in Table 1 are obtained.

TABLE 1

|  | Embodiment 1 | Embodiment 2 | Comparative embodiment 1 | Comparative embodiment 2 |
| --- | --- | --- | --- | --- |
| Initial resistance (Ω) | 50 | 120 | 5 | 40 |
| PTC characteristic ($R_{100° C.}/R_{25° C.}$) | 580 | 720 | 380 | 3 |

TABLE 1-continued

|  | Embodi-ment 1 | Embodi-ment 2 | Comparative embodiment 1 | Comparative embodiment 2 |
|---|---|---|---|---|
| Surface temperatrue (° C.) | 78 | 74 | 91 | — |
| Initial current (A) | 0.8 | 0.3 | 8 | — |

Since the higher surface temperature can quickly defog the door mirror, it is preferable that the surface temperature is higher. However, taking into consideration the prevention of the firing, the burnout and the heat burn at a time when the human body is in contact therewith, it is desirable to set the surface temperature to be 85° C. or less. Further, with regard to the initial current value, if a heavy current flows, a problem is generated in the case that the initial current value exceeds the current distribution with respect to the other electrical equipment on the basis of the battery capacity. Further, in the comparative example 2, the PTC characteristic is very small, and a self-temperature control function is not obtained.

On the basis of the comparative tests mentioned above, it is confirmed that the door mirror heater in accordance with the present invention can increase the door mirror surface temperature to a suitable temperature-on the basis of the necessary calorific power by attaching the door mirror heater to the vehicle mounting the high voltage battery thereon, whereby it is possible to suitably remove a rain drop, a dew and a frost at a cold time, the heat is not generated more than necessary, and the damage such as the heat burn or the like is not generated even in the case that the human body and the door mirror are in contact in addition that the firing and the burnout of the heater are not generated.

Embodiment 2) Invention in Accordance with Third Aspect

The inventors of the present invention have devoted themselves to conduct a further study after developing the invention in accordance with the first aspect and the second aspect mentioned above, and have completed the invention in accordance with the third aspect as a result. Accordingly, a description will be given below of details of the invention in accordance with the third aspect mentioned above. The invention in accordance with the first aspect and the second aspect exclusively has details in which only the initial resistance value of the heat generating circuit and the PTC characteristic are requirements of the invention. On the contrary, the invention in accordance with the third aspect is structured by considering the material composition in view of an actual specification while taking a workability or the like into consideration for obtaining the resistance value and the characteristic, and adding the material composition to the contents of the invention.

In other words, with regard to the structure of the heater, the door mirror heater generally includes the small door mirror heater for the light car and the compact car, and the large door mirror heater for the recreational vehicle and the minivan, as mentioned above, however, the one used in the present embodiment and a comparative example is a door mirror heater in which a comb teeth shaped electrode having a width of 0.5 mm and a pitch of 0.5 mm is arranged in a base material (PET film) having a size of 150 mm×100 mm, a PTC composition is arranged thereon, and a wiring for connecting to a power source is applied and is thereafter covered by the insulating film.

As for the PTC composition, a composition in which a carbon black is dispersed in an ethylene-acrylic acid copolymer (EAA) corresponding to a main material polymer, a composition in which an EPDM rubber is added thereto, and an ink type composition in which a titanium oxide corresponding to a metal oxide serving as the filler is further added are employed. The PTC ink is prepared in accordance with a procedure of (1) dissolving the polymer in a solvent, (2) adding the conductive particle and the filler and mixing them, and (3) dispersing the conductive particle and the filler in a polymer solution by a roll mill or the like. However, the procedure is not limited to this, but an order of the steps may be changed or the step may be subdivided into several steps.

The employed raw material is as follows:

Polymer EAA: S-call 5000 produced by Exxon Mobile

EPDM: EP22 produced by Japan Synthetic Rubber Co., Ltd.

Carbon: HTC#S(SRF) produced by Shin Nikka Carbon

Ketjen Black EC produced by Lion in Comparative example

Filler (Titanium Oxide): TIPAQUE A-100 produced by Ishihara Sangyo Kaisha, Ltd.

With respect to the composition, the PTC composition in which the EAA/carbon black is blended as described in the embodiment 1 mentioned above is employed for a comparative example 3. On the contrary, a composition in which the EAA+EPDM/carbon black are blended is employed for an embodiment 3, and a composition in which the EAA+EPDM/carbon black+titanium oxide are blended is employed for embodiments 4 to 6 and comparative examples 4 and 5. Further, a composition capable of obtaining an improved result in using 12 V in which the EAA+EPDM/carbon black+titanium oxide are blended is employed for a comparative example 6. Further, in each of the compositions, an adding amount of the carbon is adjusted in such a manner that the initial resistance value of the heat generating circuit is within 50 to 100 Ω which is particularly preferable. Details of the composition are as described in Table 2.

Testing or measuring a workability, a broken characteristic, an adhesive property, a resistance value, a PTC characteristic, a resistance stability and an electricity applying durability, with respect to each of the embodiments and the comparative examples, the results shown in Table 2 are obtained. In this case, the workability is expressed by ○ X whether a transcription at a metal mask printing time is good or bad (good: ○, bad: X). The broken characteristic is expressed by ○ X whether or not the composition falls away at a time of making a fillip of the manufactured heater (no: ○, yes: X). The adhesive property is expressed by ○ X whether or not the lower sample is pulled at a time of picking up the upper sample from the samples overlapped after being printed and dried (no: ○, yes: X). The resistance value is measured between the heater terminals by a digital multi meter. The PTC characteristic shows a rate of the resistance values ($R_{100° C.}/R_{25° C.}$) between the resistance value under a room temperature of 25° C. and the resistance value at a time when the sample is put in a 100° C. constant temperature bath. The resistance stability shows a resistance change rate between just after preparing the sample and after 24 hours. Further, the electricity applying durability shows the resistance change after an operation of applying the voltage 42 V (12 V in the comparative example 6) under 25° C. for three minutes and stopping for three minutes is repeated at 200 cycles.

TABLE 2

| | | For 42 V | | | | | For 12 V | | |
|---|---|---|---|---|---|---|---|---|---|
| | | Comparative embodiment 3 | Embodiment 3 | Embodiment 4 | Embodiment 5 | Embodiment 6 | Comparative embodiment 4 | Comparative embodiment 5 | Comparative embodiment 6 |
| Polymer | EAA (vol %) | 88 | 75.2 | 72 | 64 | 56 | 52 | 48 | 48 |
| | EPDM (vol %) | 0 | 18.8 | 18 | 16 | 14 | 13 | 12 | 12 |
| | Sub total (vol %) | 88 | 94 | 90 | 80 | 70 | 65 | 60 | 60 |
| Filler | Carbon (vol %) | 12 | 6 | 5.5 | 7 | 8.5 | 7 | 9.5 | 14 |
| | Titanium oxide (vol %) | 0 | 0 | 4.5 | 13 | 21.5 | 28 | 30.5 | 26 |
| | Sub total (vol %) | 12 | 6 | 10 | 20 | 30 | 35 | 40 | 40 |
| Workability | x~o | x | o | o | o | o | o | o | o |
| Broken characteristic | x~o | x | o | o | o | o | o | o | o |
| Adhesive property | x~o | x | x | o | o | o | o | o | o |
| Resistance value | (Ω) | 60 | 70 | 66 | 58 | 70 | 86 | 60 | 10 |
| PTC characteristic | $R_{100°C}/R_{25°C}$ | 580 | 220 | 190 | 150 | 110 | 120 | 90 | 80 |
| Resistance stability | % | −33 | −32 | −26 | −19 | +11 | +18 | +27 | −5 |
| Elec. applying durability | % | +10 | +12 | −13 | +2 | +23 | +202 | +1300 | +10 |

As is known from Table 2, the workability and the broken characteristic are better in the case that the rubber (EPDM rubber) is added, and the adhesive property is worse in the case that the amount of the filler (the titanium oxide) is small. With respect to the resistance value, the necessary resistance can be obtained by adjusting the amount of the carbon black even if the total amount of the filler is between 6 and 40%. The PTC characteristic becomes smaller in accordance with the increase of the filler amount, however, no problem is generated in the function of the heater within the range at this time. The resistance stability is best around the filler amount between 20 and 30%, however, all of the value are within tolerance. The electricity applying durability starts being deteriorated after the filler amount exceeds 35%.

Accordingly, in view of the points mentioned above, it is possible to confirm that, in order to well maintain the workability in the manufacturing and the product, the broken characteristic, the adhesive property, the resistance stability and the electricity applying durability in addition to the initial resistance and the PTC characteristic, under the 42 V use, it is effective to add the rubber to the main material polymer of the PTC layer and add the metal oxide as the filler. The adding amount is not particularly limited in the case of the rubber, however, it is preferable that the adding amount is the same level as that under the 12 V use (20% of the polymer total amount in this case). It is preferable that the filler amount is between 2 and 30% of the total amount, more particularly between 10 and 30%. The rate between the carbon and the metal oxide is adjusted in such a manner that the initial resistance value becomes between 2 and 200 Ω, preferably between 50 and 100 Ω in accordance with the description in the embodiment 1 mentioned above.

EFFECT OF THE INVENTION AND INDUSTRIAL APPLICABILITY

The present invention achieves the following effects.

In the door mirror heater in accordance with the first aspect and the second aspect of the present invention, as the door mirror heater compliant to the high voltage battery, since the initial resistance value of the heat generating circuit is set between 20 and 200 Ω, more preferably between 50 and 100 Ω, and the lower limit value of the PTC characteristic $R_{100°C}/R_{25°C}$ is set to 10 or more, more preferably, to 50 or more, it is possible to increase the temperature of the door mirror surface to the suitable temperature on the basis of the necessary calorific power by attaching the heater to the vehicle mounting the high voltage battery thereon, whereby it is possible to suitably remove the rain drop, the dew and the frost at the cold time. Further, since the heat is not generated more than necessary, it is possible to prevent the heat burn or the like in the case that the human body and the door mirror are in contact in addition that the firing and the burnout of the heater can be prevented.

Further, in addition thereto, in accordance with the door mirror heater on the basis of the third aspect of the present invention, since the rubber is added to the main material of the PTC layer, and the metal oxide is added as the filler, it is possible to well secure a workability in manufacturing and in the product, a broken characteristic, an adhesive property, a resistance stability and an electricity applying durability.

The invention claimed is:

1. A door mirror heater compliant to a high voltage battery of 42 V having a heat generating circuit provided with a PTC layer corresponding to a heating element and electrodes for applying a current to said PTC layer, wherein an initial resistance value of said heat generating circuit is set between 50 and 100 Ω, a lower limit value of a PTC characteristic $R_{100°C}/R_{25°C}$ is set to 50, an EPDM rubber is added to an ethylene-acrylic acid copolymer (EAA) of said PTC layer and blended homogeneously, and a carbon and a titanium oxide are added as a filler at a rate of filler total amount between 20 and 30 vol %.

* * * * *